Figure 1:
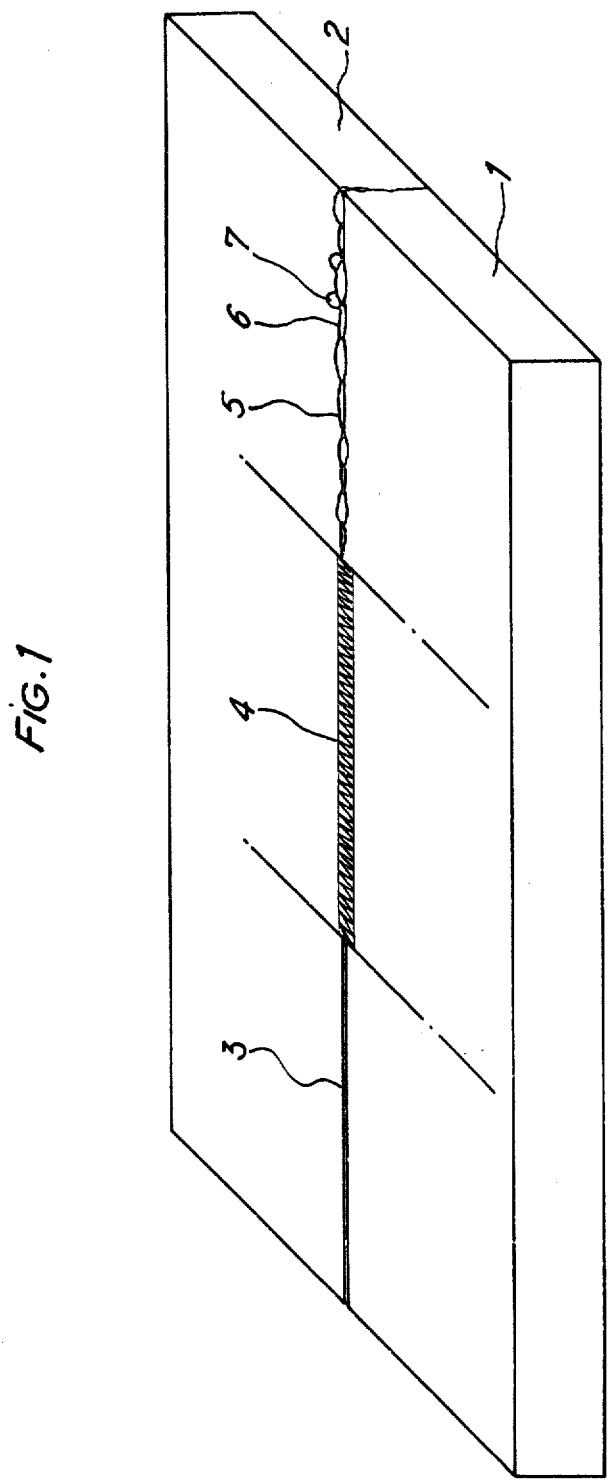

United States Patent [19]
Alais et al.

[11] 3,887,784

[45] June 3, 1975

[54] WELDING GUNS

[75] Inventors: Michel Alais, Orsay; Robert Caillot, Ezanville; Francois Corcelle, Montlhery, all of France

[73] Assignee: Commissariat a l'Energie Atomique, Paris, France

[22] Filed: Feb. 6, 1973

[21] Appl. No.: 330,067

Related U.S. Application Data

[62] Division of Ser. No. 212,274, Dec. 27, 1971, abandoned.

[52] U.S. Cl. .......................... 219/121 EM; 250/492
[51] Int. Cl. .............................................. B23k 15/00
[58] Field of Search ... 219/121 EB, 121 EM; 13/31; 346/74; 250/49.5 R, 49.5 TE

[56] References Cited
UNITED STATES PATENTS

| | | | |
|---|---|---|---|
| 2,989,614 | 6/1961 | Steigerwald | 219/121 EM |
| 3,046,936 | 7/1962 | Simons, Jr. | 219/121 EB X |
| 3,134,013 | 5/1964 | Opitz et al. | 219/121 EM |
| 3,221,133 | 11/1965 | Kazato et al. | 219/121 EB X |
| 3,271,556 | 9/1966 | Harris | 219/121 EB X |
| 3,287,735 | 11/1966 | Day, Jr. | 346/74 |
| 3,337,676 | 8/1967 | Yih et al. | 13/31 |
| 3,371,185 | 2/1968 | Anderson | 219/121 EB |
| 3,602,685 | 8/1971 | Itoh | 219/121 EM |
| 3,746,831 | 7/1973 | Sciaky | 219/121 EM |
| 3,763,345 | 10/1973 | Stohr | 219/121 EM |

*Primary Examiner*—J. V. Truhe
*Assistant Examiner*—G. R. Peterson
*Attorney, Agent, or Firm*—Young & Thompson

[57] ABSTRACT

A welding method by electron bombardment utilizes an electron gun which comprises an electron beam having an elongated cross section in the operating plane. The geometrical axis of the beam is inclined relatively to the axis of a system which influences the geometry of the electron beam before the beam is influenced by that system, while keeping the crossover point of the beam approximately on the axis of the geometry-influencing system first acting on the beam. The inclination of the beam before it passes the beam-influencing system provides greater energy density near one end of the spot than near the other end, which retards cooling of the molten metal. The elongation of the beam is more stable than if it were dependent on a variable voltage.

5 Claims, 8 Drawing Figures

WELDING GUNS

The present application is a division of copending Ser. No. 212,274, filed Dec. 27, 1971 and now abandoned.

The present invention relates to improvements in welding methods utilising electron bombardment, whereby a higher linear welding speed can be obtained.

It is known that when members of small or average thickness are welded together, the welding speed is limited, because as the speed increases, imperfections appear.

When sheets having a thickness of 1 to 2 mm are welded together, it is difficult to exceed linear speeds of about 5 meters per minute. Beyond such speeds, it has proved that there is formed in the molten pool resulting from the melting of the two pieces, heaps of solidified droplets which diminish the quality of welding to a large degree.

This phenomenon is easily understandable when it is considered that, after passage of the electron beam, the temperature rapidly falls, whereby the droplets of liquid metal which were formed under the action of the electron beam cannot mix with the pool or bath and completely fill the cavity between the two members.

These imperfections hinder the industrial development of the application of electron bombardment welding to a large number of problems such as, for example, the welding of two lips of a tube during the formation of a seam.

Various solutions have been proposed to decrease the abruptness of transition between the part placed under the beam and the part immediately adjacent thereto, during cooling.

More particularly, it has been proposed to incline the gun quite acutely but then a large part of the energy of the incident beam is retro-diffused and lost. Moreover, the results thus obtained have never been very convincing.

Just recently it has been proposed, although in fact for solving different problems, to use a gun employing a plurality of parallel beams of decreasing energy in the welding plane. It is possible that such a device would also solve the problem of rapidly welding thin sheet material but, on the other hand, the construction of such guns is quite complicated and difficult, so that it would be desirable to have a gun of simpler construction.

Moreover, it has also been proposed to use a large beam slightly convergent along the axis of symmetry, and passing through a rectangular diaphragm, the major axis of which is situated in the welding plane. This solution, which is valid in electron optics, can obviously not be used in the case of a beam having a power possibly exceeding 100 KW.

The present invention has for an object the provision of a method employing a device similar to a conventional electron bombardment gun, of known manufacture, and fitted with a single source of electrons and consequently supplying a single beam, the width of which, measured in a plane perpendicular to the welding direction, is substantially the same as that in existing apparatus, but the length of which, measured in the plane of the joint to be welded, is greatly increased.

The invention consists in a method of welding with a welding gun utilising electron bombardment including a structure having a symmetry of revolution and supplying an elongated electron beam to an operating plane, wherein the symmetry of revolution of said structure is interrupted at at least one point.

The assymetry thus introduced into the structure of the gun may be extremely small but will, however, sufficiently modify the electron beam in the desired manner. The invention has allowed to manufacture guns having a very appreciable increase in welding speed compared with that obtainable hitherto, by very slightly modifying the geometric position of the radiating structure formed by the cathode and the Wehnelt cylinder.

For example, it has been shown that, even minimal rotation of the said radiating structure about an axis perpendicular to the axis of the electron beam, has doubled the possible welding speed.

Moreover, extremely advantageous results have been obtained by effecting slight rotation of the whole electrostatic assembly comprising the cathode, the Wehnelt cylinder and the anode, about an axis perpendicular to the plane of the joint and passing through the natural or cross-over point, that is, the focussing point of the electron beam at the outlet from the acceleration space.

In all the cases referred to above, the electron lens for concentrating or focussing the electron beam on the part to be welded was formed generally by means of two reversed windings in order to maintain the orientation of the assymetry of the beam energy constant in the space.

Instead of acting on the cathode-Wehnelt cylinder assembly, a device may also be proposed in which the assymmetrical structure results from an inclination of the single cathode. Such an assembly has a very clear advantage by reason of its simplicity. However, extremely slight rotation of the cathode may cause, according to the type of gun and geometric structure of the electrodes, a lateral displacement of the beam in the plane of the anode, thus causing variation in the electron beam and making it impossible accurately to focus the beam. However, such an assembly may regain all its advantages if the gun has electrodes that are suitable for such a lateral displacement.

Finally, as regards the cathode, it may be heterogeneously constructed. This heterogeneous structure may be obtained by forming an emissive surface having, for a given temperature, an emission factor differing at two points of the cathode, whilst the structure of the cathode-Wehnelt cylinder-anode assembly remained unchanged.

The heterogeneity of the structure of the cathode may also been obtained by imparting an oval, elliptical or rectangular shape thereto, for example. Thus, the same results are obtained as before.

By way of experiment, an electrostatic cathode-Wehnelt cylinder-anode assembly of slightly oval shape has already been formed. The beam obtained had the same advantages as hitherto, but the manufacture of such an assembly was very difficult and it seems that this assembly, although advantageous from many points of view, should be reserved for certain special cases.

The same heterogeneity leading to advantageous results is also been obtained by separating the Wehnelt cylinder into a plurality of sectors maintained at different potentials.

Alternatively, there may be inserted under the focussing or concentrating coil or adjacent thereto, two low power coils arranged symmetrically on both sides of the electron beam, oriented in such a manner that two similar poles face each other.

An electrostatic field of average amplitude which is established between two parallel electrodes or between two electrodes forming a dihedron also enables the beam to be spread in the welding plane.

Figure 2:
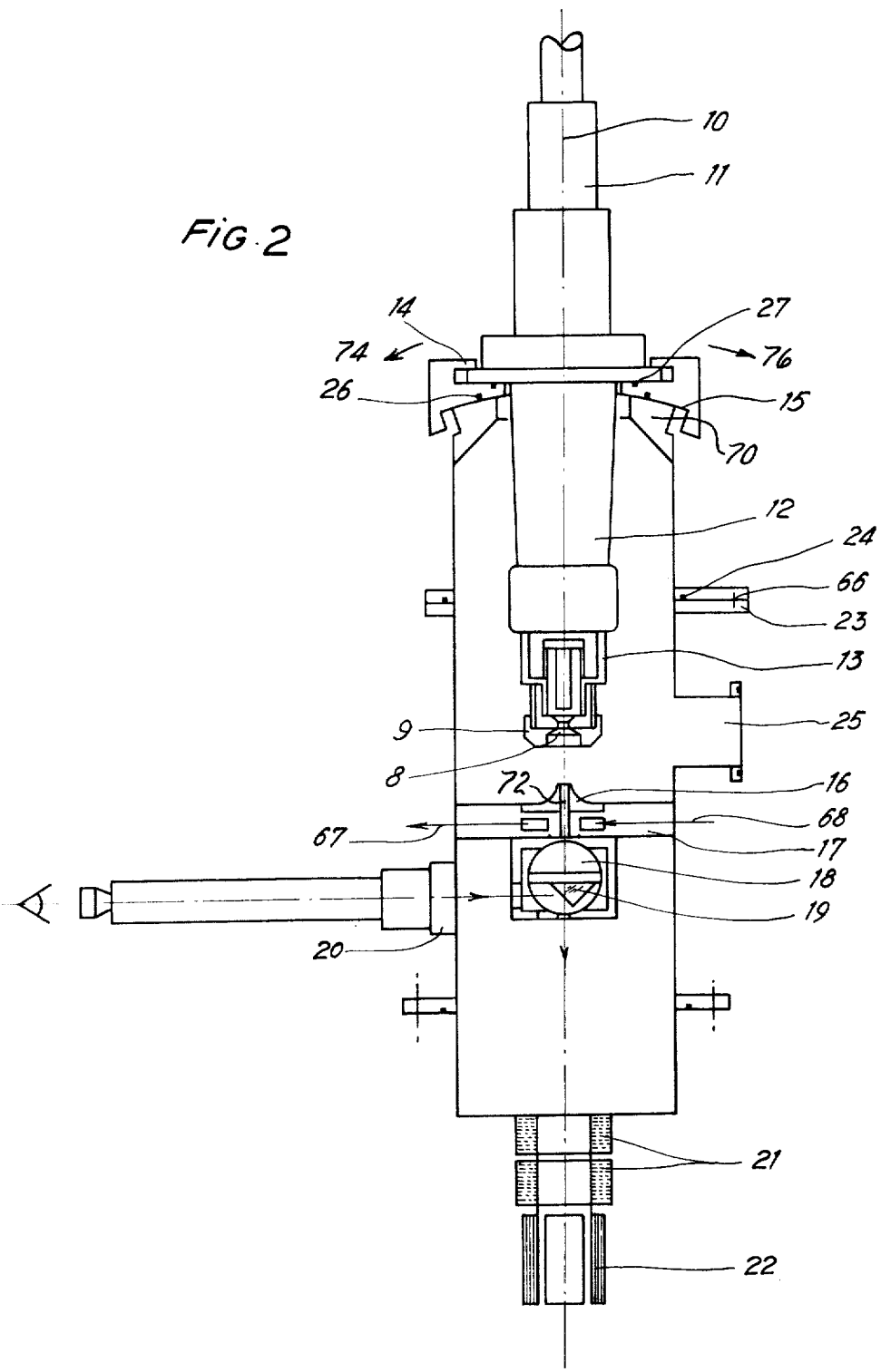
Figure 3:
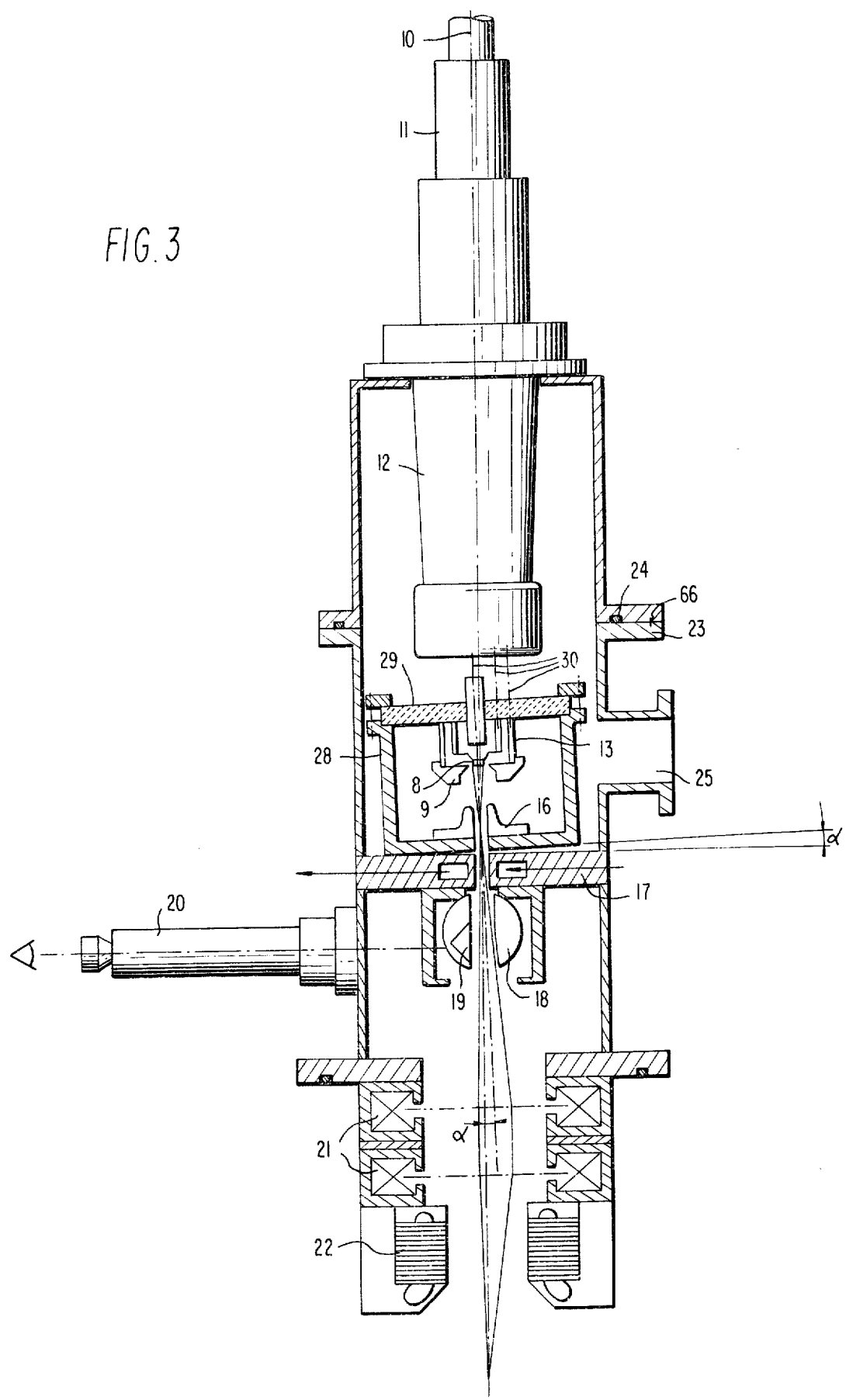
Figure 4:
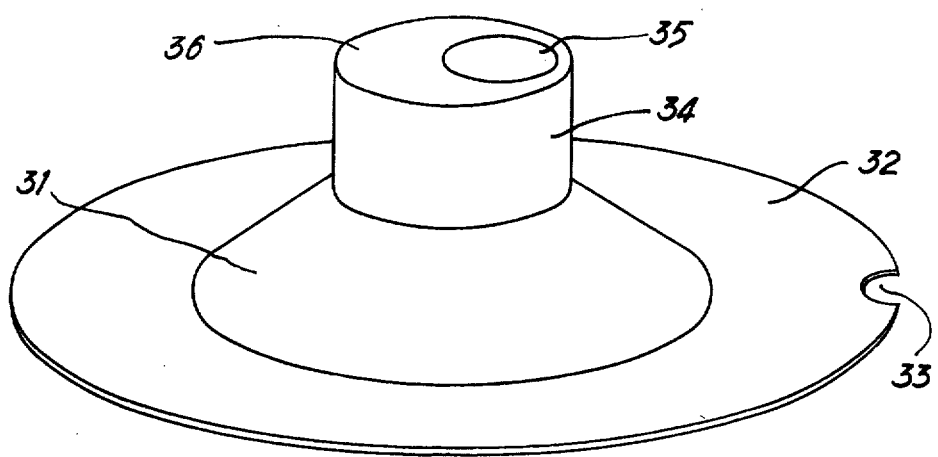
Figure 5:
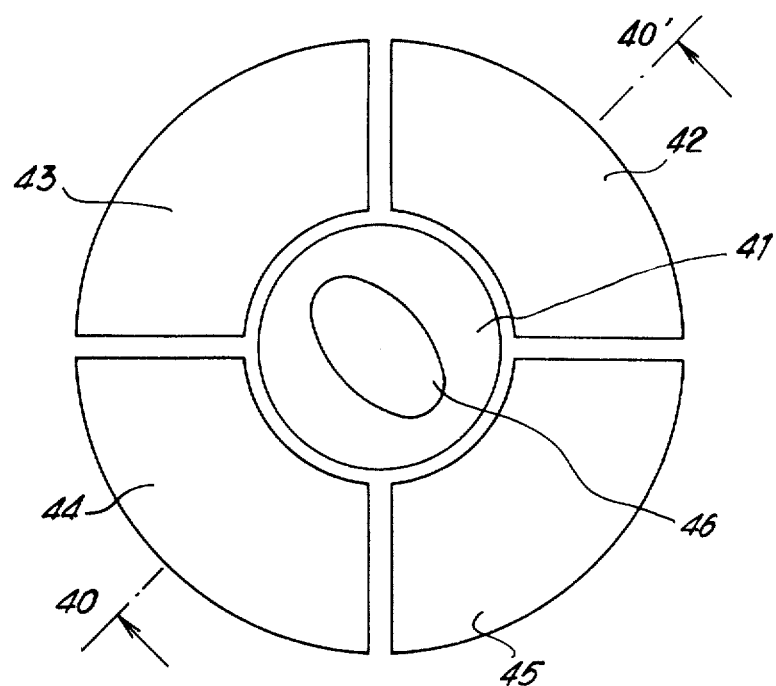
Figure 6:
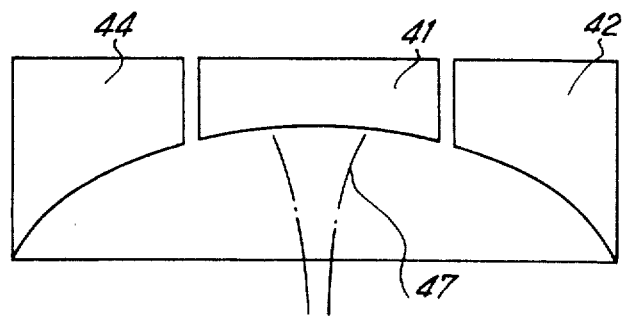
Figure 7:
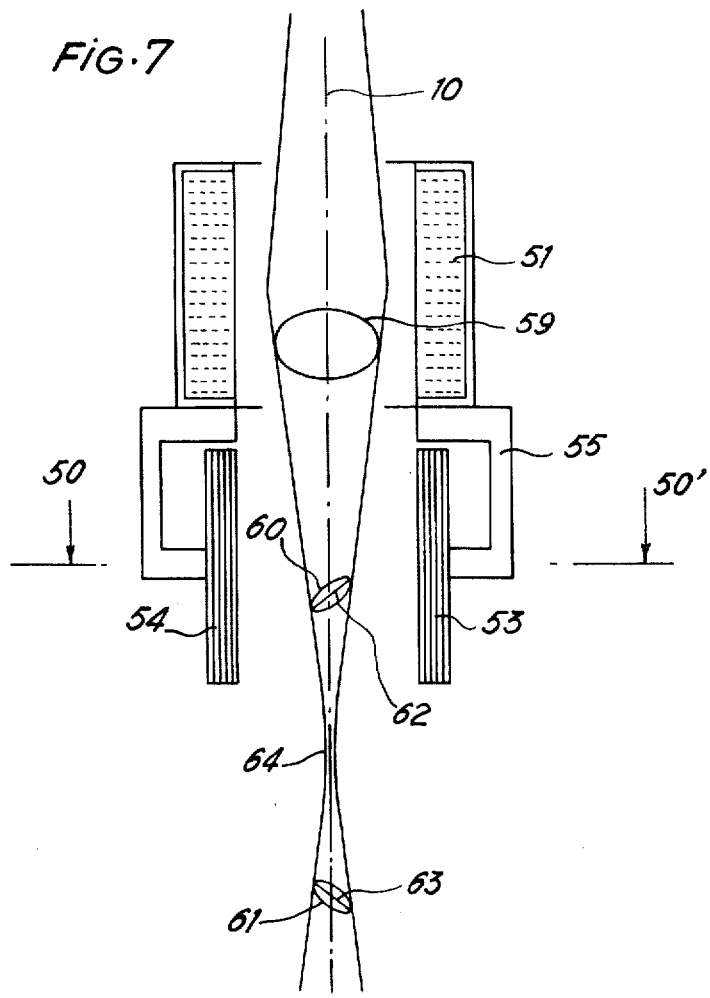
Figure 8:
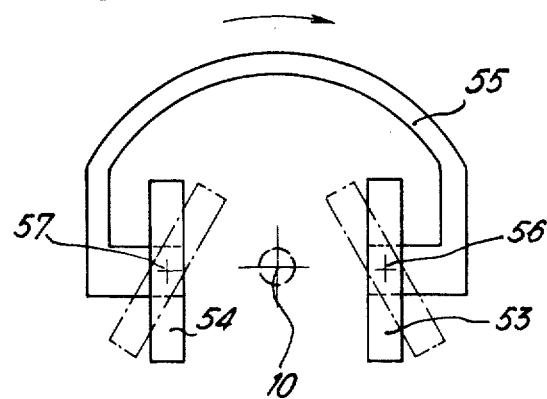

Other characteristics and advantages of the invention will appear in the description which follows with reference to the accompanying drawings, in which:

FIG. 1 shows the appearance of a weld seam;

FIG. 2 shows diagrammatically a welding apparatus according to the invention, in which the assembly of the radiating structure formed by the Wehnelt cylinder and the cathode may be moved by translation and/or rotation, FIG. 3 shows diagrammatically a welding apparatus wherein the cathode-Wehnelt cylinder-anode assembly may be inclined at a small angle, FIG. 4 shows a cathode having assymmetric emission, FIGS. 5 and 6 show two views of an assymmetric Wehnelt cylinder, and, FIGS. 7 and 8 show a device in which the beam has been modified by interposing two magnetic coils disposed immediately below the concentrating coil.

Referring now to the drawings, FIG. 1 shows two parts 1 and 2 made from stainless steel placed edge to edge and having between them free edges along the narrow cavity 3 separating the two parts.

The appearance of the welding effected with a conventional circular beam at a speed less than 5 metres per minute is shown at 4. The appearance of the weld seams is characterised by striations of small dimensions.

The appearance which the weld assumes when the welding bead exceeds 5 metres per minute and when the operation is carried out with a conventional circular beam, is shown at 5. The welding is incorrect whatever the adjustment, particularly as to power and focussing. Cavities such as 6 and large droplets 7 appear. Such an appearance revels almost intuitively too rapid a cooling of the melted substance.

FIG. 2 shows a gun according to the invention when the cathode and Wehnelt cylinder assembly forming a radiating structure is longitudinally movable and/or rotatable with respect to the remainder of the structure. The axis of symmetry of the gun structure is shown at 10. The cable for high voltage, heating current, etc. supplies is shown at 11. A high voltage insulator 12 serves as a mechanical support for a radiating structure 13 comprising a cathode 8 and a Wehnelt cylinder 9 securely connected together.

Below the cathode in the disposition shown in the drawing, and at a certain distance from the latter, is an anode 16 and a cooled diaphragm 17 each having an orifice the diameter of which is of the order of 3 millimeters, for example. Arrows 67, 68 indicate the inlet and the outlet for cooling water for a chamber provided in the diaphragm which is electrically insulated from the anode.

At 18 is a valve having a spherical dome carrying mirrors 19; this valve divides the space inside the gun into two volumes which may be separate one from the other. At 20 there is an optical sighting device or a television camera using the mirrors 19 for axial observation when the valve is shut and paraxial when the valve is open, more particulary during welding.

A concentrating or focussing lens having two reversed windings is shown at 21. Deflection coils for the electron beam assembly, already known for other purposes, are shown at 22.

A flange 23 and a joint 24 give access to the space containing the radiating structure 13. At 25 is provided a flange for access to the pump which enables the said space to be maintained under a high vacuum. The diaphragm 17 in fact enables a higher vacuum to be maintained within the space containing the radiating structure than in the space situated below this diaphragm, in which space vacuum can be maintained without major drawback under the primary vacuum in which the welding is effected. Moreover, closing of the valve 18 enables the radiating structure to be held at a high vacuum when pumping is interrupted in the lower part where atmospheric pressure may then be allowed to prevail.

The radiating structure may assume an asymmetrical position with respect to the main axis of the gun. In fact, the assembly formed by the insulator 12 and the cable 11 and forming a support for the radiating structure, is mounted so that it can be subjected to longitudinal movement along two mutually perpendicular directions and perpendicular to the shooting axis due to the provision of sliding seats represented at 14.

Moreover, this assembly may be inclined about an axis of rotation perpendicular to the plane of the welding joint, or to the plane tangential to the joint at the intersection of the joint with the axis of the gun, if the weld is not rectilinear. If the natural focussing point of the electron beam at the outlet of the acceleration space is referred to as the "cross-over" point, as is done by the majority of technicians skilled in this art, it can be said that the axis of rotation of the radiating structure passes approximately through the "cross-over" point, which point usually is sited within the anode 16. This rotation of the insulator-radiating structure assembly is effected by means of a curved sliding seat 15.

Seat 15 is the curved contact surface between an intermediary piece 14 and piece 70 affixed to the main casing of the electron gun, which casing supports the beam geometry- influencing coils 21 and 22. The axis 72 of the contact surface is perpendicular to the plane of the drawing and passes through anode 16 and defines the crossover point of the electron beam. Piece 17 supports gun structure 10 and slides on piece 70 in the direction of the arrows 74 and 76, or by the gun structure rotates relative to the other parts of the device such as coils 21 and 22, this rotation being about the axis 72.

The sealing of the vacuum prevailing in the radiation space during rotation on the slideway 15 is ensured by a joint 26. Moreover, the sealing in respect of the longitudinal movement is obtained by means of a joint 27. The concentrating lens is formed from two reversed windings so as to enable the orientation of the asymmetry of the beams created upstream of this lens to be kept constant. This arrangement enables the adjustment to be simplified.

It will be apparent that the means enabling the longitudinal and rotational movements of the radiating structure are not necessarily mounted on the apparatus all of them and that the apparatus may have, for example, only a longitudinal slide or two longitudinal slides or only a rotary slide.

Moreover, the length of the slides may be short and not exceed a few centimeters or even a few millimeters, because the movement of the radiating structure need be only very slight to prove sufficient to obtain an elongation of the spot enabling doubling of the welding speed. It will also be clear that it is then necessary to increase the beam energy.

FIG. 3 shows a gun in which the electrostatic assembly formed by the cathode, the Wehnelt cylinder and the anode, has been subjected to a rotation of small amplitude $\alpha$ with respect to the axis of symmetry of the structure, particulary to the concentrating lens 21. As in FIG. 2, at 11 is shown the supply cable securely affixed to the insulator 12.

The cathode 8 and the Wehnelt cylinder 9 forming the radiating structure are not supported by the insulator 12 in this case. The insulator 12 carries concentric disconnectable connections 30 which ensure the correct electrical connection between the cable 11, the cathode 8 and the Wehnelt cylinder 9.

The cathode 8 and the Wehnelt cylinder 9 are here securely mechanically connected to the anode 16 by means of an orificed copper frame 28, and an insulating disc 29. Thus, the cathode, the Wehnelt cylinder and the anode form a mechanically integrated electrostatic assembly. The cooled diaphragm 17 remains unchanged as well as the domed valve 18 provided with its two mirrors 19. As before, there are the two coils having reversed windings forming the concentrating lens 21, and deflection coils 22.

In this device, the elongation of the spot given by the beam in the direction of welding is obtained by causing the cathode, the Wehnelt cylinder and the anode to rotate at the most by a few degrees about an axis perpendicular to the plane of the weld and passing approximately through the cross-over point of the electron beam.

As beforehand, the upper part of the welding gun and the electrostatic assembly formed by the cathode, the Wehnelt cylinder and the anode are held under a high vacuum by means of a pump connected to the gun by the flange 25. During opening of the upper part of the gun by rotation about the axis 66 of the flange 23, the disconnectable concentric connection 30 enables separation between the electrostatic block and the conductors which terminate therein.

FIG. 4 shows a cathode of another type mounted in its support. In FIG. 4, the cathode is shown in the position in which it emits electrons upwardly. At 31 is shown a cathode support made from tantalum and comprising: a flat part 32 enabling attachment of the cathode to a base in a given position clearly defined by a notch 33; a cylindrical part 34 in which the axial cathode is mounted, formed from two materials 35, 36 in relative positions not offering any symmetry of revolution.

Thus, for a cathode operating at 2,200°C, tantalum has been arranged in the area 35, tantalum being highly electronemissive at this temperature. The cathode area shown at 36 is made from tungsten.

For a cathode operating at 1,400°C, lanthanum hexaboride $LaB_6$ is arranged in the area 35 and a sintered compound (W, Th, Zr) in the area 36.

FIG. 5 is a diagrammatic view of the beam of a cathode 41 and of a Wehnelt cylinder having a plurality of sectors 42, 43, 44, 45, seen parallel to the beam axis.

The cathode 41 is circular and made from one of the materials used generally for the manufacture of the cathode and which may be selected more particularly from the hitherto quoted materials.

Heating of the cathode is effected in the present example by means of an auxiliary electron bombardment gun but can be effected by any other conventional means without departing from the scope of the invention.

The different sectors of the Wehnelt cylinder are brought respectively to different potentials, all negative with respect to the cathode.

In the case of FIG. 5, the sectors 43 and 45 are at potentials of $-200$ v with respect to the cathode and the sectors 42 and 44 at $-500$ v with respect to the cathode.

It follows therefrom that the emitting area 46 is reduced approximately to an ellipse, the axis lengths of which would be 1.6 mm and 2.9 mm when the cathode is circular and has a diameter of 4 mm. The distance between the different sectors is 0.3 mm in the case of FIG. 5.

FIG. 6 is a section along the line 40—40' of FIG. 5. The section of two elements of the Wehnelt cylinder can be seen at 42 and 44 whilst at 41 is shown a section through the circular cathode. The beam of electrons emitted by the cathode assumes the shape shown at 47. It is noted that it does not touch the peripheral part of the cathode in a section on the plane 40—40'.

FIGS. 7 and 8 show an electron gun in which the beam of electrons is modified by interposing two beam-deforming coils arranged immediately below the concentrating or focussing coil.

The concentrating coil 51 is arranged symmetrically about the axis 10 of the electron gun structure. It is wound parallel to a plane perpendicular to the axis 10 of the beam.

At 53 and 54 are located two beam-deforming coils. They are wound in planes parallel to the axis 10 of the gun structure. The deforming coils are mounted on an assembly support 55.

FIG. 8, which shows a section along the plane 50—50' of FIG. 7 shows the deforming coils 53 and 54 as well as the assembly support 55. It will be observed that the coils can pivot by a certain angle about their axis 56 and 57 respectively as shown in dotted lines, whilst the assembly support 55 may rotate about the axis 10.

The electrical supply for the deforming coils 53 and 54 is effected so that an observer placed at the centre of the beam sees magnetic poles of the same sign.

The beam upstream of the deforming coils 53 and 54 has an axial symmetry since the whole device situated upstream is symmetrical with respect to the axis 10. The section 59 of the beam upstream of these coils through a plane perpendicular to the axis 10 is circular.

On the other hand, the sections 60 of the beam through a plane perpendicular to the axis of symmetry downstream of the sectional plane 50—50' are elliptical. The same applies to another section 61 of the beam through another plane perpendicular to the axis.

The further novel feature with respect to the deformations obtained by the means described hereinbefore consists in that the major axis 62 of the section 60 is not parallel to the major axis 63 of the ellipse 61 obtained by the intersection of the beam through another plane perpendicular to the axis 10. The ellipse thus obtained in a plane perpendicular to the axis of the gun thus is deformed when the intercepting plane moves along the axis 10 of the gun. It assumes more particularly a circular appearance at a point 64. The beam thus has the appearance of a focal surface which is more contracted adjacent the point 64 but spreading out above and below. This property of the beam is particularly advantageous when it concerns welding edge to edge parts whose sides to be placed in contact are insufficiently faced.

It is thus, in fact, possible to adjust the beam in such a manner that the minimal cross-section corresponding to the point 64 is formed at the base of the weld but that the beam has, at the level of the input surface of the beam in the joint to be welded, an elliptical section, the major axis of which makes an angle of zero with the plane of the joint. All the projections and all the other imperfections on the sides of the parts to be welded can thus be caused to disappear without appreciably decreasing the power applied in depth to the weld.

Another means of deforming the beam may consist in two electrodes brought to the same polarity, arranged below and very close to the concentrating lens. These electrodes may be arranged, for example, at the location of the two coils 22 sectioned in FIGS. 2 and 3. They may alternatively be arranged between the concentrating lens and the deflection coils 22. These electrodes may be, for example, flat and parallel to each other.

The examples for applying the invention described above enable the entire scope of the invention to be better understood. Intended for rapid welding of sheets of ordinary thickness and thin sheet, the gun according to the invention also adapts to the production of deep welding of thick parts. In fact, the extension of the beam in the direction of the plane of the joint produced according to the device of the invention enables more extensive heating of the melting metal to be obtained for the same power. There results therefrom a very great decrease in the temperature gradient which improves the crystallisation conditions. Moreover, extension of the melted zone protects the latter from consequences of any rapid variations in power of the beam and oscillatory dynamic phenomena originating in the molten pool. Finally, the fact that the heating obtained is more extensive, enables more complete evacuation of the gases sorbed previously by the metal and of the metallic vapours. In conclusion, the gun of local asymmetry according to the invention enables all the problems to be solved which the user faces both for rapid welding and for deep welding.

We claim:

1. In a method for welding a workpiece by electron bombardment of an operating plane of said workpiece, comprising generating by an electron gun having at least one electron beam geometry-influencing system an electron beam having a crossover point and having an elongated cross section, and impacting said operating plane by said electron beam; the improvement comprising inclining at an acute angle the geometrical axis of said beam relative to the axis of said influencing system before the beam is influenced by said system while keeping the crossover point of the beam approximately on the axis of said influencing system first acting upon the beam, said electron gun comprising two portions through which successively passes the electron beam before it is influenced by said influencing system, said two portions contacting each other along a curved sliding seat, and effecting said inclination of the geometrical axis of the beam by rotating one said portion relative to the other portion about an axis making a substantial angle with the direction of the electron beam between a Wehnelt cylinder and said beam geometry-influencing system, said rotation being effected by sliding one said portion along said sliding seat.

2. A method as claimed in claim 1, wherein said rotation is effected about an axis which approximately passes through said crossover point of the electron beam and is perpendicular to said beam before it arrives at said crossover point.

3. A method as claimed in claim 1, wherein one portion of the electron gun, comprising a cathode and a Wehnelt cylinder of the gun, is rotated relative to another portion comprising an anode of the gun by said sliding.

4. In a method for welding a workpiece by electron bombardment of an operating plane of said workpiece, comprising generating by an electron gun having at least one electron beam geometry-influencing system an electron beam having a crossover point and having an elongated cross section, and impacting said operating plane by said electron beam; the improvement comprising inclining at an acute angle the geometrical axis of said beam relative to the axis of said influencing system before the beam is influenced by said system while keeping the crossover point of the beam approximately on the axis of said influencing system first acting upon the beam, providing the gun with a cathode having an electron-emissive surface comprising two areas having different electron emissivities at their working temperature, and placing the area with the higher emissivity at some distance beside the axis of said influencing system.

5. In a method for welding a workpiece by electron bombardment of an operating plane of said workpiece, comprising generating by an electron gun having at least one electron beam geometry-influencing system an electron beam having a crossover point and having an elongated cross section, and impacting said operating plane by said electron beam; the improvement comprising inclining at an acute angle the geometrical axis of said beam relative to the axis of said influencing system before the beam is influenced by said system while keeping the crossover point of the beam approximately on the axis of said influencing system first acting upon the beam, said electron gun comprising first and second portions through which successively passes the electron beam before it is influenced by said influencing system, said first portion comprising a cathode, a Wehnelt cylinder and an anode; and the two portions contacting vacuum-tightly each other along respective surfaces, said method comprising inclining the axis of the contact surface of at least one of said portions at a slight angle with the axis of the electron beam in said first portion.

* * * * *